B. Webb,
Saw-Mill Head-Block.
No. 3,983. Patented Apr. 1, 1845.
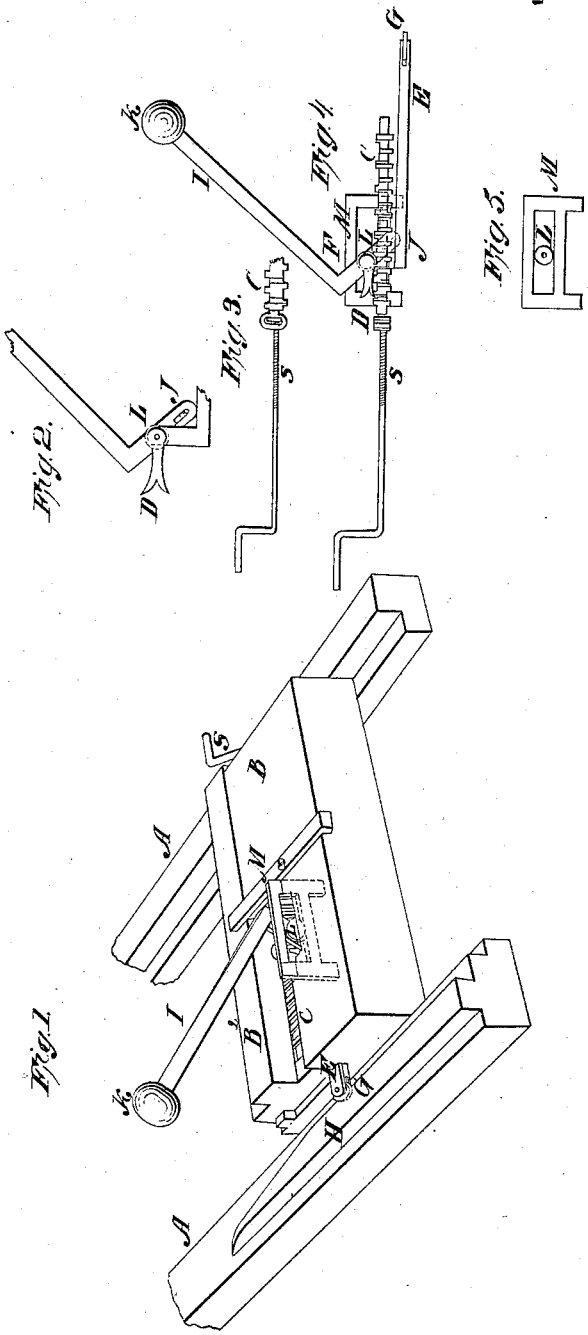

UNITED STATES PATENT OFFICE.

BENJAMIN WEBB, OF WARREN, NEW YORK.

MODE OF SETTING LOGS ON CARRIAGES OF SAWMILLS.

Specification of Letters Patent No. 3,983, dated April 1, 1845.

*To all whom it may concern:*

Be it known that I, BENJAMIN WEBB, of the town of Warren, in the county of Herkimer and State of New York, have invented a new and useful Improvement in the Construction of Self-Setting Apparatus for Sawmills, which is described as follows, reference being had to the annexed drawings of the same, making part of this specification, of which—

Figure 1 is a perspective view. Fig. 2 is a side elevation or section of part of the lever, hand and bars. Fig. 3 is a section of the cogged bar and screw. Fig. 4 is a side elevation of cogged bar, sliding bar, hand, lever, screw and railway. Fig. 5 is a side elevation of the railway.

A is a part of the carriage of the saw mill made in the usual manner. B is the tail block; c, rack or horizontal cogged bar fastened to the movable, tail block cogged on its four sides, the distance apart of the cogs on the several sides corresponding with the various thicknesses of boards required to be sawed.

D is a hand constructed so as to push the rack toward or from the saw.

E is a horizontal sliding bar for moving the hand D which is attached to one end of said bar (turned up at right angles) by a bolt F passed through said bar and hand.

G is an anti-friction roller turning in a mortise in the outer end of the bar E on a vertical axle, said roller, as the carriage moves forward toward the saw, coming in contact with a horizontal inclined plane H fastened to the floor of the mill, or to the frame of the building, or in any convenient place, and causing the bar E to move laterally toward the saw carrying with it the hand D and the rack C and sliding part of the tail block B² by which the log resting on the tail block is set.

I is a weighted lever for bringing back the bar and hand to their former position to be in readiness for another set and this return of the bar takes place as the carriage is gigged back and the roller passes over the inclined plane. The fulcrum J of this weighted lever is inserted into the main tail block B and is placed in an oblong slot in the lever. This lever is also connected to the bar E by means of the bolt F that passes through the bar and hand. K is the weight on the end of the lever which is raised as the roller is passing over the inclined plane and the bar is moving toward the saw, the gravity of said weight and the return of the roller over the inclined plane causing the bar to recede from the saw and resume its former position to be in readiness for another set.

L is an anti-friction wheel and M a rail way for retaining the hand at a uniform angle of inclination while at rest and during its operation. The wheel L turns on the bolt F that connects the hand D, bar E, and lever I together.

The rail way stands in a horizontal position and is fastened to the main body of the tail block by bolts or other suitable fastenings. It consists of a cast iron plate having an oblong opening in the same whose sides are parallel, the upper and lower of which forming the rail way and against which the wheel turns, and by which the wheel is caused to move in a horizontal line and thus preventing the bar and hand from rising or falling above or below a horizontal plane as they are moved back and forth, the slot in the lower end of the lever preventing any binding action or impingement of the parts as the weighted end of the lever is raised or lowered.

The hand may be operated by the attendant by raising or lowering the lever; and by reversing the position of the hand on the rack its movement may be reversed for bringing back the tail block. The same description of apparatus may be applied to the head block to be operated by hand or otherwise.

In changing the position or reversing the horizontal cogged bar C for sawing various thicknesses of stuff from the same log, a certain adjustment of the position of the teeth of the bar in relation to the position of the latch D is requisite to prevent spoiling the board at the commencement of the sawing; which adjustment is effected by means of a horizontal screw *s* attached to the cogged bar and made to turn in a box in the slide block without this adjustment of the cogged bar longitudinally by means of said screw a board might be spoiled at every change of the position of the cogged bar for another kind of sawing or thickness of boards to be sawed by the hand striking against the top of a cog of the bar instead of dropping into its proper mesh therewith.

I do not claim setting the head and tail block by means of a rack, pall and bevel; but What I do claim is—

1. The before described combination of the rail way and wheel with the sliding bar, hand, and lever arranged and operated in the manner and for the purpose above set forth.

2. I also claim the setting of the reversible cogged bar by means of which it can be adjusted to the hand when reversed or shifted for cutting different thicknesses of boards in the same log and thus avoid the necessity of spoiling the first board cut after shifting or turning the cogged bar as described.

BENJAMIN WEBB.

Witnesses:
THOMAS SENNEBACKER,
WM. S. HUESTIS.